T. A. WILLARD.
STORAGE BATTERY.
APPLICATION FILED SEPT. 30, 1915.

1,237,733.

Patented Aug. 21, 1917.

Inventor:
Theodore A. Willard
by Thurston & Kwis
Attys.

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

1,237,733.

Specification of Letters Patent. Patented Aug. 21, 1917.

Application filed September 30, 1915. Serial No. 53,204.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and particularly to means for sealing the terminal posts so as to prevent leakage of acid to the exterior of the cover, and also for insulating the posts and connectors from the cover.

It has been proposed by me heretofore to seal the post by providing in the cover around the post a well or receptacle adapted to contain sealing material and by providing on the connector which is usually lead-burned to the post a flange which extends down into the sealing material. This construction is shown and claimed in a Patent No. 1,150,917, granted to me on August 24, 1915.

It has been proposed also by me to simultaneously seal the post and insulate the same as well as the connector from the cover when the latter is formed of metal, instead of rubber, by fitting the flange of the connector into an insulating cup, which is placed and sealed in the well or depression surrounding the post. This construction is shown and claimed in a pending application, No. 38,169, filed by me July 6, 1915.

Additionally it has been proposed by me to seal the post by providing around the post beneath the cover a well or receptacle and by providing on the cover a flange which surrounds the post and extends down into the well or receptacle and is sealed therein. This construction is shown and claimed in a pending application, No. 38,167, filed by me July 6, 1915.

The present construction in certain respects resembles or contains features embodied in the three constructions above referred to, but is a modification wherein certain features or elements are combined in such a manner that there is produced a way of sealing and insulating which is novel and efficient and admits of rapid assemblage of parts.

The invention may be briefly summarized as consisting in certain novel details of construction and combinations of parts which will be described in the specification and set forth in the appended claims.

Figure 1:
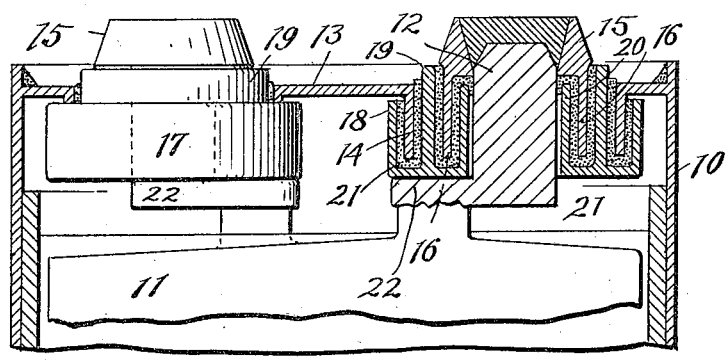
Figure 2:
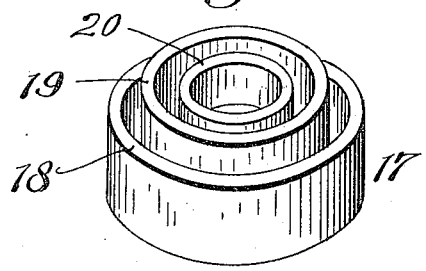

In the drawing, Figure 1 is a sectional view through one jar or cell of a storage battery equipped with my invention, and Fig. 2 is a perspective view of an insulating cup employed in the construction.

Referring now to the drawings, 10 represents the battery jar, which contains the positive and negative plates 11, from which extend upwardly the positive and negative posts 12. The jar is provided with a cover 13 which may be formed and with the present invention preferably is formed of metal, but which may be formed of rubber or other suitable material. The cover is provided with terminal post openings which are considerably larger than the posts and with a depending flange 14 surrounding each opening.

The posts 12 extend through the cover and are provided with connectors 15 which are preferably lead-burned to the posts and may consist of terminal connectors or cross connectors for connecting together the posts of adjoining cells. The connectors 15 are each provided with a downwardly extending flange 16 which surrounds the post and extends downwardly inside of and substantially to the bottom of the flange 14 of the cover. There is an annular space between the flange 16 and the post and a somewhat wider annular space between the flange 16 and the surrounding flange 14 of the cover.

For the purpose of sealing the connectors so as to prevent leakage of acid, I employ in conjunction with each post and with the flanges 14 and 16 surrounding the same a sealing cup 17 which is preferably, although not necessarily, formed of hard rubber. This cup surrounds the post and may rest on the strap from which the post extends. The cup is provided with three upstanding flanges 18, 19 and 20 forming two wells or chambers in the form of continuous grooves, the middle flange separating the two wells being higher than the other two. Prior to placing the cup in position around the post these two grooves are filled with sealing compound 21, which is preferably in plastic condition when placed in the grooves. Then after the cup is in place about the post the cover 13 and connector 15 are placed in position, and in so doing the flanges 14 and 16 are lowered into the sealing compound contained in the two grooves or wells. The cover and connector may be heated previous to being placed in position so that the flanges will melt the sealing compound and so as to secure a very effective sealing. The mere act of lead-burning the connector to the post will sufficiently heat the connector for this purpose. As an alternative the cup with its sealing compound may be heated from an external source prior to placing the cover and connector in position, so as to melt the sealing compound.

Each of the cups 17 rests on the strap 22 which joins together the plates of one polarity, and from which the positive or negative post extends.

It will be seen that not only is the connector very effectively sealed by reason of the fact that the flanges of the cover and connector extend down into the grooves filled with sealing compound, but the post and the connector are separated from the cover not only by the sealing compound, but also by the upstanding insulating partition or flange which is between the flange of the connector and the flange of the cover. In consequence there is little likelihood of a short circuit between the connector and cover, especially as the middle flange extends well up above the top of the cover.

I do not desire to be confined to the exact details shown, but aim in my claims to cover all modifications which do not involve a departure from the spirit and scope of my invention. For example, it is not essential that the posts and other parts including the flanges of the cup, cover and connector, and the socket of the connector in which the upper end of the post extends, be circular in cross-section. These parts may be made rectangular or may be given any other desired shape, the circular shape being shown for convenience of illustration.

Having thus described my invention, what I claim is:—

1. In a storage battery, a jar having a cover provided with an opening for a terminal post, a terminal post extending through said opening, a receptacle surrounding the post, a connector on the post, said cover and connector having downturned portions surrounding the post and extending into said receptacle and sealed therein.

2. In a storage battery, a jar having a cover provided with an opening for a terminal post, a terminal post extending upwardly through said opening, a receptacle surrounding the post, a connector on the post, said cover and connector having flanges extending into said receptacle and sealed therein, and said receptacle having means extending between and separating the said portions of the cover and connector.

3. In a storage battery, a jar having a cover provided with an opening for a terminal post, a post extending through said opening, a receptacle surrounding the post and provided with two compartments, a connector on the post, said cover and connector having flanges extending into said two compartments and sealed therein.

4. In a storage battery, a jar having a cover for a terminal post, a terminal post extending through said opening, two wells or chambers having a dividing wall of insulating material surrounding the post, and a connector on the post, said cover and connector having flanges extending downward into the two wells and sealed therein.

5. In a storage battery, a jar having a cover provided with an opening, a post extending upwardly through the opening, a connector on the post, an insulating cup or receptacle surrounding the post and having three upstanding walls or flanges forming two concentric wells or chambers, and concentric downturned flanges on the cover and connector extending into said wells or chambers and sealed therein.

6. In a storage battery, a jar having a cover provided with an opening for a terminal post, a terminal post extending through the opening, and a receptacle of insulating material placed about the post, said cover having a down-turned portion extending into and sealed in said receptacle.

7. In a storage battery, a jar having a cover, a terminal post extending upwardly through the cover, a receptacle of insulating material placed about the post and a connector on the post, and provided with a down-turned portion extending into and sealed in the receptacle.

In testimony whereof, I hereunto affix my signature.

THEODORE A. WILLARD.